UNITED STATES PATENT OFFICE.

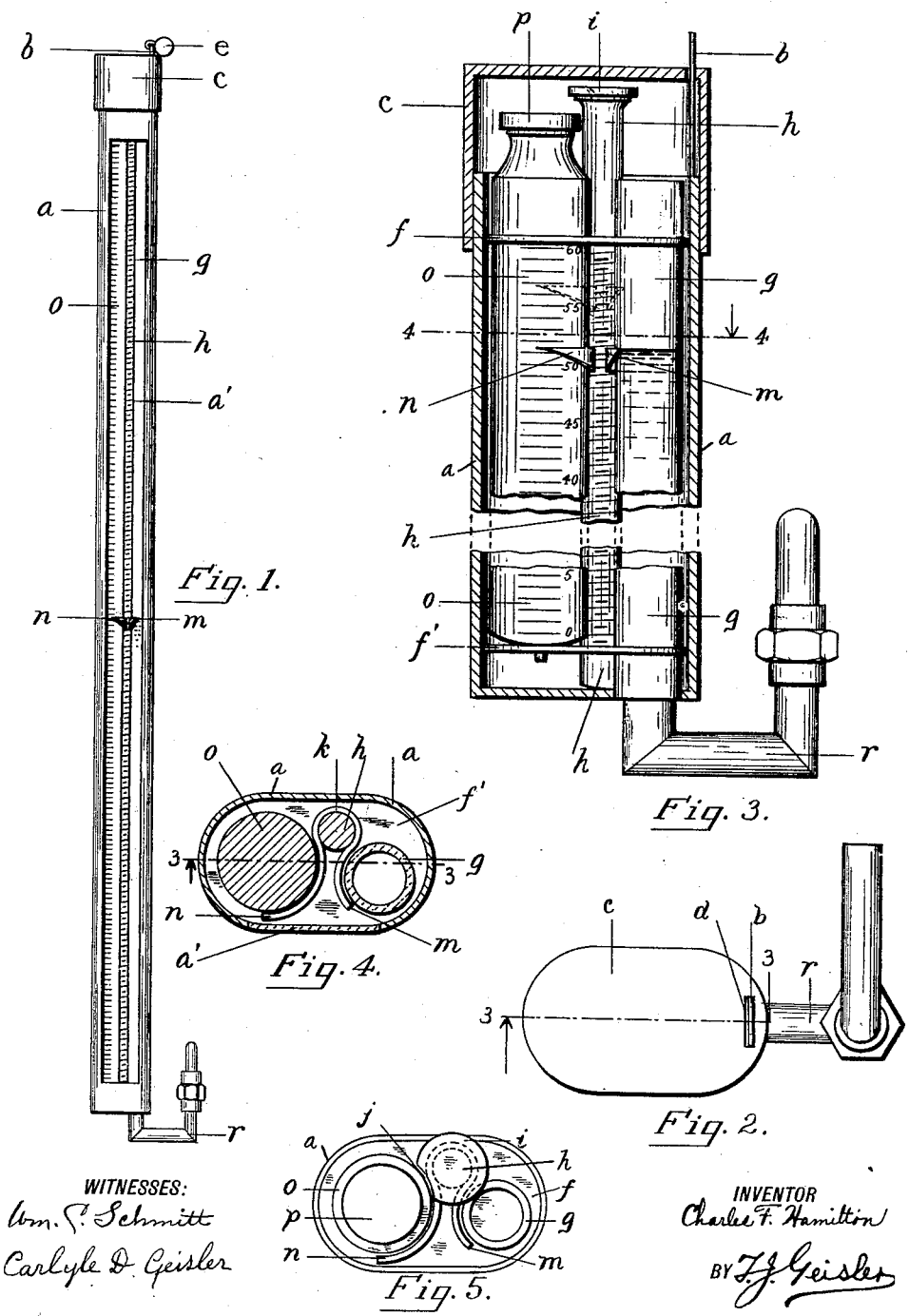

CHARLES F. HAMILTON, OF PORTLAND, OREGON, ASSIGNOR TO ADJUSTABLE LIQUID GAUGE COMPANY, A CORPORATION OF OREGON.

ADJUSTABLE LIQUID-GAGE.

1,111,455.  Specification of Letters Patent.  Patented Sept. 22, 1914.

Application filed September 19, 1912. Serial No. 721,322.

*To all whom it may concern:*

Be it known that I, CHARLES F. HAMILTON, a citizen of the United States, and a resident of Portland, county of Multnomah, and State of Oregon, have invented a new and useful Improvement in Adjustable Liquid-Gages, of which the following is a specification.

My invention has for its object the providing of a novel form of liquid gage which may be attached to a barrel, or other liquid container, for the purpose of accurately ascertaining the quantity of liquid put into such container, the amount drawn off, and the quantity of liquid still in the container at the time of inspection.

My improved gage is also provided with locking means for preventing the gage being tampered with or adjusted by an unauthorized person.

My invention is particularly useful to merchants dealing in liquids, for my gage will enable them to keep an accurate personal check on all liquids received, the quantity sold during certain intervals, and the amount still on hand.

The results mentioned, and other incidental features, are attained by me by means of the devices illustrated in the accompanying drawings, constituting a part of this specification, in which:

Figure 1 is a front elevation of my gage with the common form of pipe connections for attaching the gage to a barrel; Fig. 2 is a top view of the parts shown in Fig. 1, but on a larger scale, the lock, however, being omitted; Fig. 3 is a vertical section taken approximately on the line 3—3 of Figs. 2 and 4, in the direction indicated; in dotted lines are shown in this figure the pointers of the indicator raised to a higher position; Fig. 4 is a horizontal section taken on the line 4—4 of Fig. 3, looking in the direction indicated; and Fig. 5 is a top view of the case with cap removed, showing the devices contained in the gage case and the arrangement of the parts.

A case, *a*, is provided at its upper end with a projecting ear *b*, which serves as a staple for receiving the lock *e*, as hereinafter described. A section of the case is cut away, as at *a'*, and in such opening is inserted a glass panel to permit inspection of the gage glass *g*. A cap, *c*, provided with a slot, *d*, fits over the upper end of the casing *a*, the staple *b* projecting through such slot, and the lock *e*, when secured as shown in Fig. 1, will prevent the cap being removed. The case *a* is provided with interior transverse webs, *f, f'*, near its ends, such webs being perforated to receive the devices placed within the case.

The gage glass, *g*, is provided at the base with a convenient piece of piping *r*, by which the gage glass is connected with the liquid container. A threaded rod, *h*, is rotatably held in the webs, *f, f'*, parallel to the gage glass, and is provided with a head *i*, having a portion cut away, as shown at *j* in Fig. 5. Mounted on the threaded rod, *h*, is a threaded indicator *k*, provided with oppositely pointing pointers *m, n*, one overlying the gage glass *g* and the other the scale rod *o*, the latter also held in place by the webs *f, f'*. The scale rod, *o*, is graduated preferably in several different scales, figured to adapt the gage to be used for indicating volumes in different units. The graduated rod, *o*, is provided with a head *p*, rendering its rotation convenient for placing one or the other scale in view. By adjusting the threaded rod, *h*, to its position shown in Fig. 5, with respect to its head *i*, the scale rod *o* may be removed from the case. The pointers, *m, n*, are curved to partly encircle the gage, *g*, and the graduated rod *o*, respectively. In this way the indicator *k* is prevented from turning when the screw-rod *h* is rotated, and in consequence the rotation of the latter will cause the indicator *k* to move up or down in correspondence with the rotation of the screw rod *h*.

The method of operating my gage is as follows: When the lock, *e*, is taken off, the cap, *c*, may be removed and the threaded rod *h* turned until the pointer *m* is brought into alinement with the level of the liquid in the gage-glass *g*. When the cap, *c*, is then locked in place, it is impossible for anyone to change the indicator. As the liquid is drawn out of the container the level of the liquid in the gage glass will be lowered correspondingly, and the difference between the initial reading and any subsequent reading will show the exact amount of liquid drawn off in the intervening period. When liquid is put into a container, my gage will also show the exact amount added.

By keeping the gage locked and accessible to only one person, an accurate check may be kept by the proprietor himself on the liquid received or disposed of, or the amount on hand.

Instead of using the form of lock shown herein, any convenient form of locking device may be used. The type of locking means shown is merely for illustration.

I claim:

1. A liquid gage comprising a case; a threaded adjustment-rod journaled in the case; a gage-glass and a scale-rod, in the case, arranged side by side to the adjustment-rod; an indicator threaded on the adjustment-rod, said indicator provided with opposite pointers, one thereof overlying the gage-glass, the other the scale-rod; means for connecting the gage-glass with a container; key-controlled means for preventing the manipulation of the adjustment-rod; and the case being adapted to permit the inspection of the gage-glass and the scale-rod.

2. A liquid gage comprising a case; a threaded adjustment rod journaled in the case; a gage glass and a scale rod, in the case, arranged side by side to the adjustment rod; said scale rod being rotatably journaled in the case and provided with a plurality of graduated faces; an indicator threaded on the adjustment rod, said indicator provided with opposite pointers, one thereof overlying the gage glass, the other the scale rod; means for connecting the gage-glass with a container; key-controlled means for preventing the manipulation of the adjustment rod; and the case being adapted to permit the inspection of the gage glass and the scale rod.

3. A liquid gage comprising a case provided with a lock-controlled opening portion; a threaded adjustment rod journaled in the case; a gage glass and a scale rod, in the case, arranged side by side to the adjustment rod; said scale rod being rotatably journaled in the case and provided with a plurality of graduated faces; an indicator threaded on the adjustment rod, said indicator provided with opposite pointers, one thereof overlying the gage glass, the other the scale rod; means for connecting the gage glass with the container; and the case being adapted to permit the inspection of the gage glass and the scale rod.

4. A liquid gage comprising a case made with an open top; a threaded adjustment rod journaled in the case; a gage glass and a scale rod, in the case, arranged side by side to the adjustment rod; an indicator threaded on the adjustment rod, said indicator provided with opposite pointers, one thereof overlying the gage glass, the other the scale rod; means for connecting the gage glass with the container; a cap movably affixed on the open top of the case; key-controlled means for locking the cap in place; and the case being adapted to permit the inspection of the gage glass and the scale rod.

5. A liquid gage comprising a case made with an open top; a threaded adjustment rod journaled in the case; a gage glass and a scale rod, in the case, arranged side by side to the adjustment rod; said scale rod being rotatably journaled in the case and provided with a plurality of graduated faces; an indicator threaded on the adjustment rod, said indicator provided with opposite pointers, one thereof overlying the gage glass, the other the scale rod; means for connecting the gage glass with the container; a cap movably affixed on the open top of the case; key-controlled means for locking the cap in place; and the case being adapted to permit the inspection of the gage glass and the scale rod.

6. A liquid gage for barrels, comprising a transparent tube having means for connecting it to a barrel so as to place the interior of the two in communication, an indicating scale located adjacent and parallel to said tube, a pointer adapted to coöperate with said scale and tube, a rotatable screw for moving said pointer longitudinally of the scale and tube, and means for preventing unauthorized manipulation of said screw.

C. F. HAMILTON.

Witnesses:
  Wm. C. Schmett,
  W. Lewis Coop.

---

Copies of this patent may be obtained for five cents each, by addressing the "Commissioner of Patents, Washington, D. C."